US008797582B2

(12) United States Patent
Hosokawa

(10) Patent No.: US 8,797,582 B2
(45) Date of Patent: Aug. 5, 2014

(54) TAPE PRINTING APPARATUS, AND DISPLAY METHOD IN THE TAPE PRINTING APPARATUS

(75) Inventor: Takeshi Hosokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 13/450,136

(22) Filed: Apr. 18, 2012

(65) Prior Publication Data

US 2012/0274981 A1 Nov. 1, 2012

(30) Foreign Application Priority Data

Apr. 27, 2011 (JP) ................................ 2011-099466

(51) Int. Cl.

*G06F 3/12* (2006.01)
*B41J 3/407* (2006.01)
*G06F 15/00* (2006.01)
*G06K 1/00* (2006.01)

(52) U.S. Cl.

CPC .................................... *B41J 3/4075* (2013.01)
USPC .......................... 358/1.15; 358/1.1; 358/1.13

(58) Field of Classification Search

USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

2007/0201069 A1* 8/2007 Tanaka et al. ................ 358/1.13
2011/0222946 A1* 9/2011 Murayama ...................... 400/76

FOREIGN PATENT DOCUMENTS

JP 05-313610 A 11/1993
JP 2009-039893 A 2/2009

* cited by examiner

*Primary Examiner* — Thierry L Pham
(74) *Attorney, Agent, or Firm* — ALG Intellectual Property, LLC

(57) ABSTRACT

A tape printing apparatus, including: an input unit configured to input print data and a layout of the print data; a display unit configured to have a display screen; a dividing unit configured to divide the print data into a plurality of blocks based on the layout input by the input unit; a display control unit configured to display the print data by scrolling the print data on the display screen, using the display unit, for each of the blocks divided by the dividing unit; and a printing unit configured to print the print data on a tape-shaped print medium in accordance with the layout input by the input unit.

10 Claims, 7 Drawing Sheets

TAPE PRINTING APPARATUS, AND DISPLAY METHOD IN THE TAPE PRINTING APPARATUS

CROSS-REFERENCE

The entire disclosure of Japanese Patent Application No. 2011-099466 filed on Apr. 27, 2011, which is hereby incorporated by reference in its entirety.

BACKGROUND

In the related art, as a tape printing apparatus that prints print data such as characters and the like on a printing medium formed in a tape shape, the tape printing apparatus having a preview function that lays the print data out in the same way as that of the printing, to thereby display the laid-out print data on a display screen has been known (for example, see, Japanese Patent Publication No. 2009-39893). The tape printing apparatus of this kind is configured to input the layout at the time of printing, and prints, for example, a plurality of lines in accordance with the input layout. When printing the plurality of lines, print data is displayed in such a state of being arranged in the plurality of lines even in the case of performing a preview display, so that there is an advantage in that the printing state is confirmed before printing.

However, in the tape printing apparatus of this kind, it is difficult to enlarge the size of the display screen, so that the whole print data is reduced in size to be displayed in the case of displaying the preview of the print data that is laid-out, for example, in a plurality of lines. Therefore, when the number of laid-out lines is large, there is difficulty in seeing characters which have become small.

SUMMARY

Various embodiments may provide a tape printing apparatus which may confirm a state of print data laid out in a plurality of lines while maintaining excellent visibility.

An aspect of the invention is directed to a tape printing apparatus, including: an input unit that inputs print data and a layout of the print data; a display unit that has a display screen; a dividing unit that divides the print data into a plurality of blocks based on the layout input by the input unit; a display control unit that displays the print data by scrolling the print data on the display screen, using the display unit, for each of the blocks divided by the dividing unit; and a printing unit that prints the print data on a tape-shaped print medium in accordance with the layout input by the input unit.

According to the aspect of the invention, the print data is divided into the plurality of blocks based on the layout, and the divided print data is scrolled for each of the divided blocks, so that the print data is displayed with excellent visibility on the display screen in a state of reflecting the layout at the time of printing, thereby confirming the layout of the print data on the display screen.

Another aspect of the invention is directed to the tape printing apparatus according to the above aspect of the invention, wherein when the layout of the print data input by the input unit is configured in a plurality of lines, and the number of the plurality of lines exceeds the number of displayable lines of the display unit, the dividing unit divides the print data into the blocks in a line unit.

According to this aspect of the invention, the print data is divided into the plurality of blocks without breaking the layout of the print data, so that the layout of the print data may be more accurately confirmed on the display screen.

Still another aspect of the invention is directed to the tape printing apparatus according to the above aspect of the invention, wherein the display control unit scrolls, in the same direction as that when the printing unit prints the print data on the print medium, each block of the print data divided by the dividing unit.

According to this aspect of the invention, the print data may be displayed on the display screen in a manner such that a state in which the print data is printed is more strongly reflected.

Yet another aspect of the invention is directed to the tape printing apparatus according to the above aspect of the invention, wherein the display control unit arranges, in the same order as an arrangement order in the layout input by the input unit, data within each block of the print data divided by the dividing unit, and displays the arranged data by scrolling the arranged data.

According to this aspect of the invention, each block is displayed in a form close to the layout of the whole print data, so that the layout of the print data may be more appropriately confirmed on the display screen.

Still yet aspect of the invention is directed to the tape printing apparatus according to the above aspect of the invention, wherein the display control unit arranges the following block at an end of a single block of the print data, and successively displays the plurality of blocks by scrolling the plurality of the blocks using the display unit.

According to this aspect of the invention, the whole print data is scrolled in a single direction, so that the whole print data may be smoothly displayed, thereby rapidly confirming the layout of the print data.

Further another aspect of the invention is directed to the tape printing apparatus according to the above aspect of the invention, wherein the display control unit scrolls a single block of the print data to the end thereof on the display screen in a first direction, scrolls a corresponding block in a second direction perpendicular to the first direction to thereby remove the scrolled corresponding block from the display screen, and scroll the following block in the second direction to thereby display the scrolled next block on the display screen.

According to this aspect of the invention, the direction of the scroll of the print data may be changed, so that the layout of the print data may be confirmed on the display screen without causing a sense of discomfort by dividing and displaying the print data.

Still further another aspect of the invention is directed to a displaying method in a tape printing apparatus which includes a display unit of displaying input print data on a display screen and prints the print data on a tape-shaped print medium in accordance with an input layout, the displaying method including: dividing the print data into a plurality of blocks based on the input layout; and displaying the print data by scrolling the print data for each of the divided blocks using the display unit.

According to this aspect of the invention, the print data may be divided into a plurality of blocks based on the layout, and displayed for each of the divided blocks, so that the print data may be displayed with excellent visibility on the display screen in a state of reflecting the layout at the time of printing, thereby confirming the layout of the print data on the display screen.

According to the aspects of the invention, the print data may be displayed with excellent visibility on the display screen in the state of reflecting the layout at the time of printing, thereby confirming the layout of the print data on the display screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

In the present embodiment, a tape printing apparatus which prints an image on a tape based on input character strings or pictographs will be described as an embodiment of a document processing apparatus.

Figure 1:
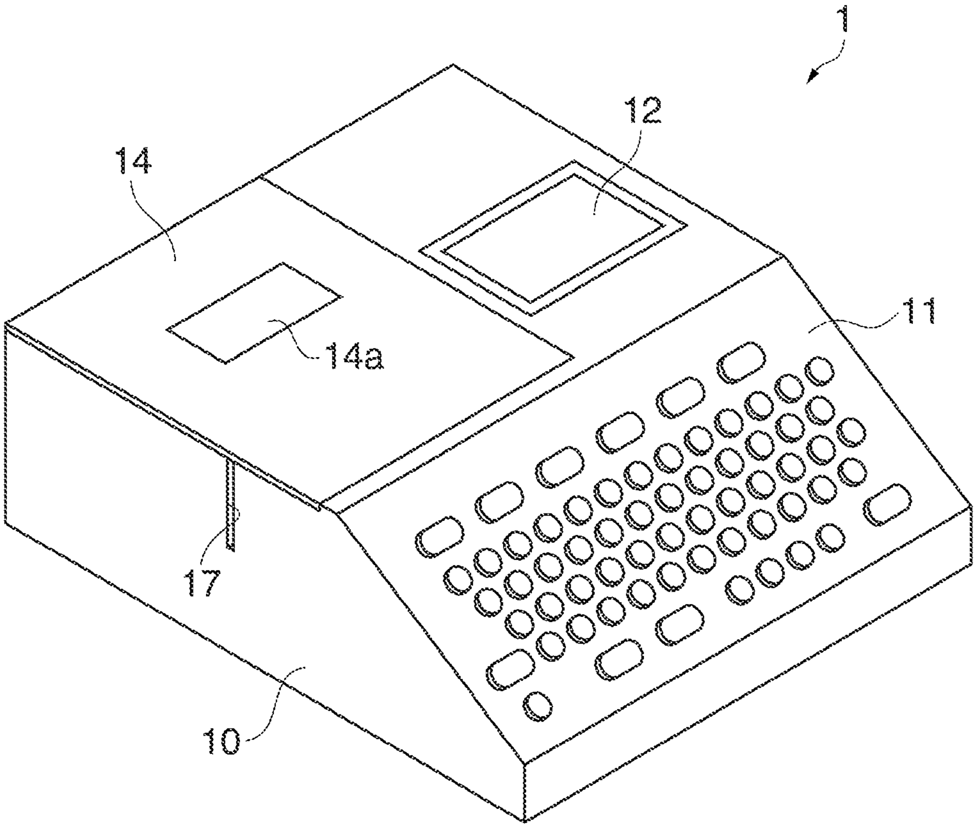
FIG. 1 is a perspective diagram showing the appearance of a tape printing apparatus according to an embodiment of the present invention.
Figure 2:
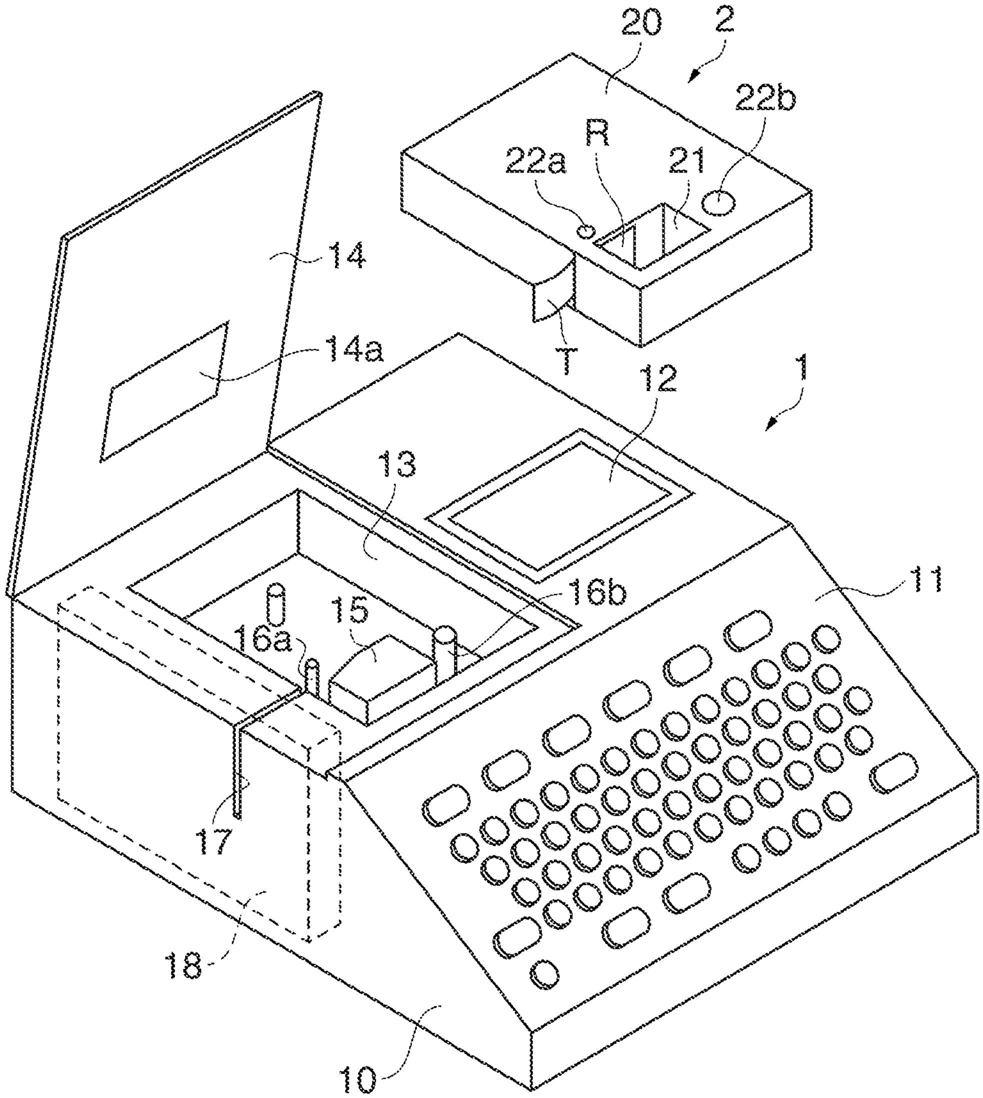
FIG. 2 is an overview perspective diagram showing an overview of a state in which an opening/closing lid of the tape printing apparatus shown in FIG. 1 is open.

FIGS. 1 and 2 are perspective diagrams showing the appearance of a tape printing apparatus 1 according to the present embodiment, and FIG. 2 shows a state in which an opening/closing lid 14 of the tape printing apparatus 1 is open.

As shown in FIGS. 1 and 2, the tape printing apparatus 1 has a configuration in which a main body is received in an approximately box-shaped housing 10, and includes a keyboard 11 on this side of the top surface of the housing 10.

The keyboard 11 is an input unit that receives a variety of input operations and selection operations by a user such as input of character strings, and the like, and includes a plurality of character keys that can input character strings composed of kana, kanji, alphabet, numbers, symbols, and the like, a line feed key that designates a line feed position, and a plurality of control keys that instructs a variety of operations with respect to the tape printing apparatus 1.

The control keys of the keyboard 11 includes a power source key for the switching on and off of a power source, a conversion key for converting input kana into kanji, a selection key for confirming the input character strings and the like, a delete key for deleting the input character strings, a cursor key used in a movement, and the like of a cursor, a preview key for executing a preview display of the input character strings, a printing key for executing printing, a menu key for displaying a menu screen, a pictograph key for displaying a pictograph selection screen, a shift key, and the like.

On the depth side of the upper surface of the housing 10, a display unit 12 composed of a liquid crystal display device, and the like is provided. The display unit 12 as a display screen is configured using a display panel, for example, an LCD (Liquid Crystal Display) panel, an organic EL (Electro-Luminescent) panel, and the like, thereby achieving monochrome display or color display. The display unit 12 is driven by a display driving unit 41 (see, FIG. 3), which will be described later, to thereby form an image by a plurality of pixels arranged in a matrix shape. In the display unit 12, a text editing screen of displaying characters input from the keyboard 11 while print data to be printed is input, a menu screen of executing setting of functions of the tape printing apparatus 1, and the like, a message screen for displaying a message concerning operations of the tape printing apparatus 1, a preview screen of displaying a printing state for the input character strings on the text editing screen, and the like.

On the depth side of the upper surface of the housing 10, a recessed portion 13 for mounting a tape cartridge 2 is formed to be adjacent to the display unit 12. An upper surface of the recessed portion 13 is open, and the opening/closing lid 14 is provided in an openable and closable manner to close the opening. When the opening/closing lid 14 is in an opening state, the tape cartridge 2 is attachable and detachable. A light-transmissive confirmation window 14*a* is provided in the opening/closing lid 14, so that whether the tape cartridge 2 is mounted to the recessed portion 13 may be visibly confirmed from the outside. A thermal head 15 and rotating shafts 16*a* and 16*b* constituting a transportation mechanism 16 (see, FIG. 3) are installed in a bottom surface of the recessed portion 13, and when the tape cartridge 2 is mounted to the recessed portion 13, the thermal head 15 is engaged with a hole-shaped head fitting portion 21 installed in the tape cartridge 2, and at the same time, the rotating shafts 16*a* and 16*b* are respectively engaged with hole-shaped driven units 22*a* and 22*b*.

In the tape cartridge 2, both a strip-shaped tape T and an ink ribbon R are stored in a cartridge case 20. The tape T is a print medium of the tape printing apparatus 1, and is configured in a manner such that an adhesive layer is formed on the back surface of a substrate composed of a synthetic resin sheet such as PET (polyethylene terephthalate) or a paper material, and a surface of the adhesive layer is covered with release paper.

The tape printing apparatus 1 may correspond to a plurality of kinds of tape cartridges 2 in which a width, a material (a material of the substrate), and a color of the tape T, and the like differ, so that the tape cartridge 2 in accordance with the application or tastes of a user may be used by the user. A plurality of holes (not shown) for identifying the tape T which is built-in is provided on a back surface of the tape cartridge 2, and the tape printing apparatus 1 may identify types of the tape of the mounted tape cartridge 2 using an identification sensor 19 (see, FIG. 3) such as a micro switch, and the like, which is provided on the bottom surface of the recessed portion 13.

When the tape cartridge 2 is mounted to the recessed portion 13, the surface of the tape T faces the thermal head 15 through the ink ribbon R in the head fitting portion 21. A plurality of heating elements (not shown) which is arranged in a row in a direction perpendicular to a longitudinal direction (a transportation direction) of the tape T is formed in thermal head 15, so that ink of the ink ribbon R is transferred (thermal transfer) to the surface of the tape T by selectively heating each of the plurality of heating elements. Consequently, on the surface of the tape T, dots are formed in a position corresponding to the heating element which is heated. Here, when rotating the rotating shafts 16*a* and 16*b*, the tape T and the ink ribbon R are transported, so that the tape T is discharged to the outside of the cartridge case 20, and the ink ribbon R is wound inside the cartridge case 20. The thermal transfer is repeatedly carried out while transporting the tape T and the ink cartridge R little by little, so that an image including a plurality of dots is printed to the surface of the tape T.

A slit 17 that communicates with the outside of the housing 10 and the recessed portion 13 is provided in a side surface of the housing 10, and the printed tape T which is discharged from the cartridge case 20 is transported toward the outside of the housing 10 through the slit 17 by a predetermined amount. A cutter unit 18 for cutting the tape T that crosses the slit 17 is disposed inside the housing 10, and the printed portion of the tape T is separated by the cutter unit 18 to thereby be discharged from a tape discharge opening that is an opening portion of the slit 17 as a tape piece (label).

Figure 3:
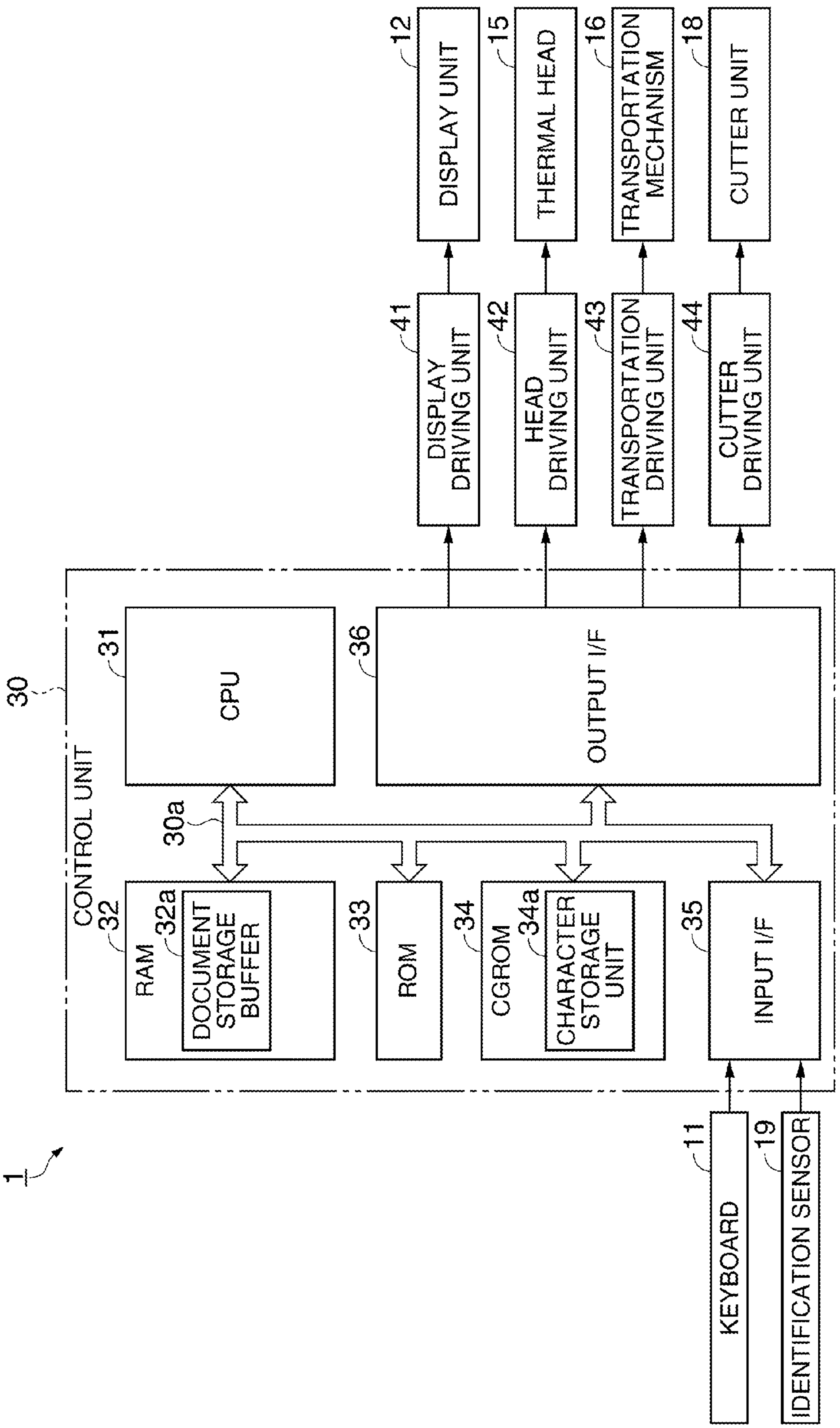
FIG. 3 is a block diagram showing a circuit configuration of a tape printing apparatus.

FIG. 3 is a block diagram showing a circuit configuration of the tape printing apparatus 1.

As shown in FIG. 3, the tape printing apparatus 1 includes the above described keyboard 11, display unit 12, thermal head 15, transportation mechanism 16 including the rotating shafts 16*a* and 16*b* (see, FIG. 2), cutter unit 18, and identification sensor 19, and further includes a control unit 30 that performs overall control of operations of the tape printing apparatus 1, a display driving unit 41 that displays an image by driving the display unit 12, a head driving unit that drives the thermal head 15 to generate heat, a transportation driving unit 43 that drives the transportation mechanism 16, a cutter driving unit 44 that drives the cutter unit 18, and the like. The display driving unit 41 constitutes the display unit together with the display unit 12.

The control unit 30 functions as a computer, and includes a CPU (Central Processing Unit) 31, a RAM (Random Access Memory) 32, a ROM (Read Only Memory) 33, a CGROM (Character Generator ROM) 34, an input interface (I/F) 35, an output interface (I/F) 36, and the like, which are connected to each other through a bus 30*a*.

The CPU 31 controls a variety of operations of the whole tape printing apparatus 1 by reading and executing a control program stored in the ROM 33.

The RAM 32 is a storage unit that is formed of a volatile storage device, and temporarily stores the control program which is executed by the CPU 31, data and processing results which are processed by an operation of the program, character code strings which are input from the keyboard 11, display image data which is displayed on the display unit 12, print image data which is printed by the thermal head 15, and the like. In the present embodiment, a document storage buffer 32*a* is provided in the RAM 32 as a buffer for storing the character code strings. In addition, the character code strings, and the like may be stored in a flash memory, or the like which is a non-volatile storage device.

The ROM 33 and the CGROM 34 include the non-volatile storage device such as a mask ROM, the flash memory, and the like, and the control program executed by the CPU 31, a variety of data, and the like are stored in the ROM 33.

In the CGROM 34, font data of characters (including pictographs and symbols) that can be printed in the tape printing apparatus 1 is stored. The font data is bitmap type data for generating characters printed by the thermal head 15 or characters displayed on the display unit 12. The bitmap type font data includes a plurality of dots, and each dot corresponds to the heating element of thermal head 15 or pixels of the display unit 12.

In the CGROM 34, the font data is stored by associating a character code with each type and each size of a plurality of fonts. The CPU 31 obtains corresponding font data from the CGROM 34 by designating the type of the font, a character size, and the character code, and forms display image data and print image data using the font data. In the present embodiment, the font data of the characters is stored in a character storage unit 34*a* of the CGROM 34. Further, outline type font data which is easily adapted to a variety of character sizes may be used as the font data.

The keyboard 11 and the identification sensor 19 are connected to the input interface 35 (I/F). When the keyboard 11 is operated by a user, the keyboard 11 receives the operation as an input operation, and outputs, to the CPU 31 through the input interface 35, key information corresponding to operated keys. In addition, the identification sensor 19 is a sensor that detects a plurality of holes that is provided in the tape cartridge 2 mounted in the housing 10 as described above. The input interface 35 outputs identification information corresponding to a detection value of the identification sensor 19 to the CPU 31, and the CPU 31 determines types of the tape cartridge 2 based on the identification information.

The display driving unit 41, the head driving unit 42, the transportation driving unit 43, and the cutter driving unit 44 are connected to the output interface 36, and respectively drive the display unit 12, the thermal head 15, the transportation mechanism 16, and the cutter unit 18 based on a control of the CPU 31.

Figure 4:
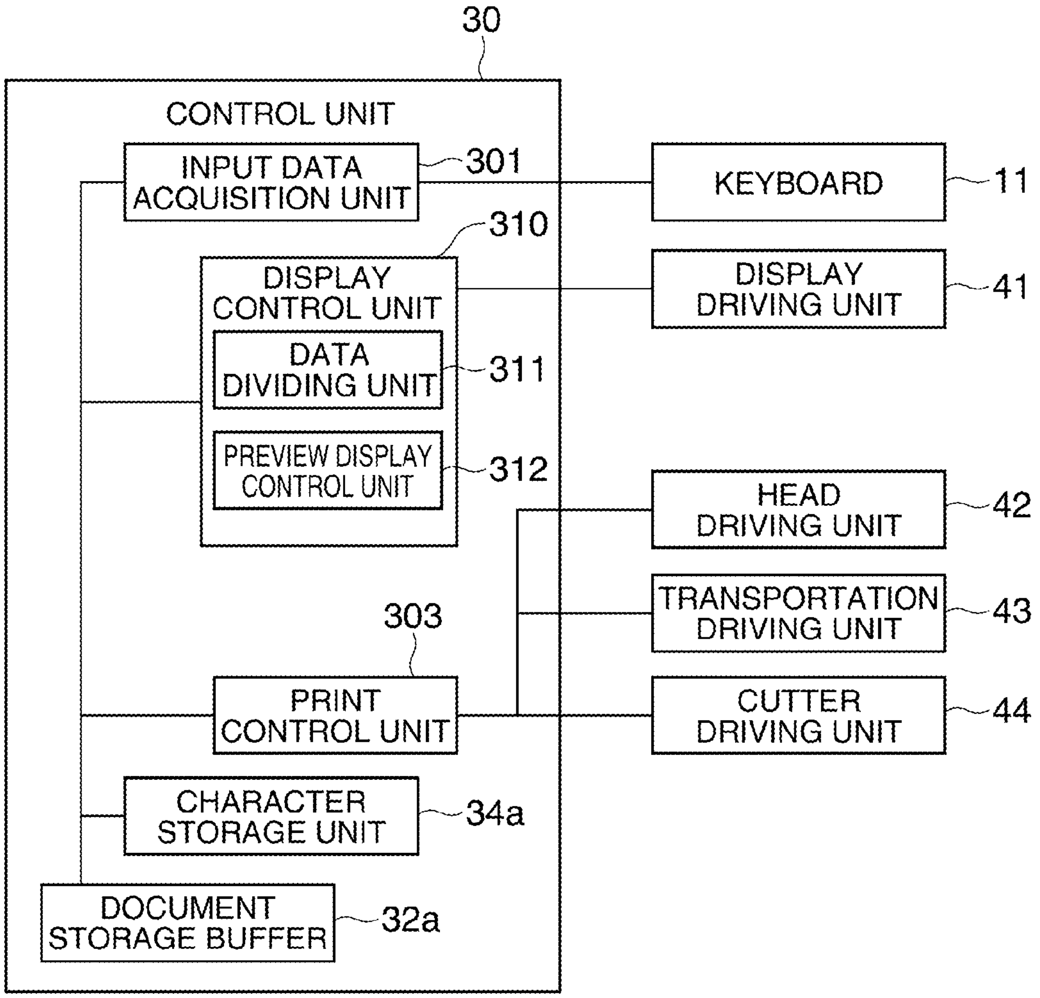
FIG. 4 is a diagram showing a functional configuration of a tape printing apparatus.

FIG. 4 is a diagram showing functions realized by the control unit 30 as functional blocks. Each of the functional blocks of FIG. 4 is realized by cooperation of hardware and software of the control unit 30 by executing the control program by the CPU 31 of the control unit 30.

The control unit 30 includes an input data acquisition unit 301 that acquires characters as the print data input by the character key of the keyboard 11, a line feed code input by the line feed key, and a variety of instructions input by the control key. Here, the line feed code is information that designates how the characters are to be divided into lines at the time of printing, and corresponds to the layout in the invention. The input data acquisition unit 301 constitutes the input unit together with the keyboard 11.

When a user operates keys of the keyboard 11, and the keyboard 11 outputs key information corresponding to the operated keys, the input data acquisition unit 301 acquires the key information. The input data acquisition unit 301 specifies a character code of the input characters based on the acquired key information, and stores the character code in the document storage buffer 32*a* of the RAM 32.

When a user repeats input of characters a plurality of times, the character code of the input characters is sequentially stored in the document storage buffer 32*a* of the RAM 32, so that a character code string (text data) including a plurality of character codes is formed.

In addition, the control unit 30 includes a display control unit 310 that displays the input characters on the display unit 12. The display control unit 310 reads character codes that are acquired by the input data acquisition unit 301 and stored in the document storage buffer 32*a*, acquires font data corresponding to the character codes from the CGROM 34, and generates display image data using the font data. The display control unit 310 supplies the generated display image data to the display driving unit 41, and displays the input characters and pictographs on the display unit 12 using the display driving unit 41. When the character code string is stored in the document storage buffer 32*a*, the display control unit 310 sequentially reads the font data corresponding to each of the character codes constituting the character code string from the character storage unit 34*a* of the CGROM 34, and generates the display image data for displaying the character strings.

The display control unit 310 includes a data dividing unit 311 and a preview display control unit 312 in order to perform a preview display to show the print state of the character string input by the operation of the keyboard 11. When the character code string stored in the document storage buffer 32*a* includes a line feed code to be configured of a plurality of lines, the data dividing unit 311 performs a process of dividing the character code string into a plurality of blocks in a line unit.

When the preview display is performed, the characters are displayed on the display unit 12 in a state in which the characters are arranged in accordance with the layout input by the keyboard 11. Thus, a user may confirm, on the display unit 12 before the printing, an arrangement state of the characters that are printed on the tape T at the time of printing. Due to this, when the preview display is performed, line-feeding is conducted with respect to the character string in accordance with the line feed code included in the character code string to thereby display the whole character string composed of a plurality of lines.

However, the number of characters displayable at one time is limited by a size or a displayable area of the display unit 12 and a display resolution. The display control unit 310 has a reduced display function that displays the character with the number of dots less than the original number of dots, so that many characters are displayed on the display unit 12, however, visibility is reduced along with an increase in a reduction rate. Therefore, the control unit 30 sets a single line or a plurality of lines into a single block by the data dividing unit 311 (dividing unit), and divides the whole character string corresponding to the character code string into a plurality of blocks.

The preview display control unit 312 (display control unit) performs a control of displaying, on the display unit 12, the character string corresponding to the character code string divided by the data dividing unit 311 for each of the blocks. There is a plurality of methods as a displaying method, and as a first displaying method, a method in which a single block is displayed on the display unit 12, the following block is scrolled on the display unit 12 successively to the single block, and the whole character string is displayed by repeating this may be given. The direction of scroll of this case is the same direction as the direction that is printed on the tape T by the thermal head 15. Each character of each block is scrolled on the display unit 12 in an order that is input by the keyboard 11 within the block, that is, in an order that is printed on the tape T. For example, a character initially printed on the tape T acts as the beginning on the display unit 12, and is scrolled so as to be moved from the right end of the display unit 12 to the left end thereof. Due to this, a state of the scroll on the display unit 12 closes to a state in which the tape T is discharged from the discharge opening of the slit 17 at the time of printing, thereby more appropriately confirming a printing state.

In addition, as a second display method, a method in which a character string of a single block is scrolled in the same direction as that of the first method, display is performed until the single block is completely moved to the outside from on the display unit 12, and then a character string of the following block appears on the display unit 12 to thereby perform scroll may be given. In the second method, when the block reaching the end of the display unit 12 disappears from the display unit 12, and the following block appears on the display unit 12, the scroll may be performed in a different direction.

In addition, when the character string corresponding to the character code string that is stored in the document storage buffer 32*a* is the number of lines that is displayable on the display unit 12 at one time, the data dividing unit 311 does not perform division of the character string. The number of lines of the character code string, or the number of lines of the character string corresponding to the character code string may be determined based on the number of line feed codes included in the character code string.

The character code string stored in the document storage buffer 32*a* becomes the layout that can be printed on the tape T at one time. For example, when the number of lines that can be printed on the tape T is up to three lines, the character code string that can be input by an operation of the keyboard 11 is up to three columns, and the character code string equal to more than four lines is not printed, so that the input is limited. This limitation is determined by the control unit 30 based on a width size of the tape T that is set to the recessed portion 13, a font size set by the control key of the keyboard 11, and a type of the font. The width size of the tape T may be determined by the control unit 30 based on a detection value input from the identification sensor 19 by identifying a type of the tape T that is set to the recessed portion 13. In addition, when the number of printing lines is set separately from the width of the tape T by the operation of the keyboard 11, the number of lines of the character code string that can be input by the keyboard 11 is limited to the set number of printing lines. Consequently, the data dividing unit 311 divides, in a line unit, the character code string (or the character string) having the number of lines that is limited to correspond to the tape width of the tape T, or having the number of lines that is limited by a unique setting. Due to this, based on the tape width of the tape T, or when the number of lines that is limited by the unique setting is smaller than the number of lines that is displayable on the display unit 12, it is not necessary that the data dividing unit 311 performs the dividing.

The control unit 30 includes a print control unit 303 that performs printing when the print key of the keyboard 11 is operated by a user. The print control unit 303 disposes font data in accordance with a line feed code while reading the font data from the character storage unit 34*a* based on the character code string stored in the document storage buffer 32*a*, so that print image data is generated and output to the head driving unit 42, and the print image data is printed on the tape T by the thermal head 15. The print control unit 303 constitutes the print unit together with the thermal head 15 and the head driving unit 42.

Figure 5A:
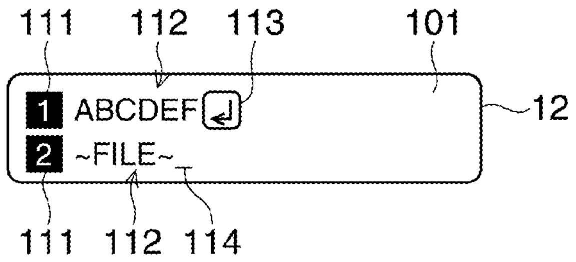
FIGS. 5A to 5E are diagrams showing transition of a display state in a case of carrying out a first display method.
Figure 6A:
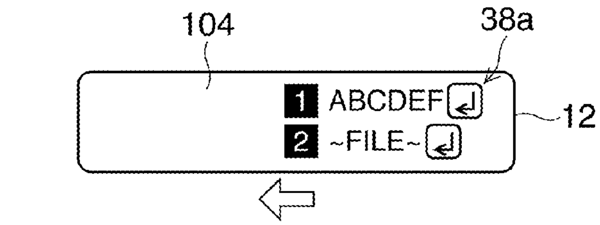
FIGS. 6A to 6G are diagrams showing transition of a display state in a case of carrying out a second display method.
Figure 6B:
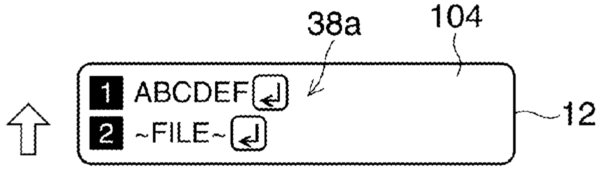
Figure 6C:
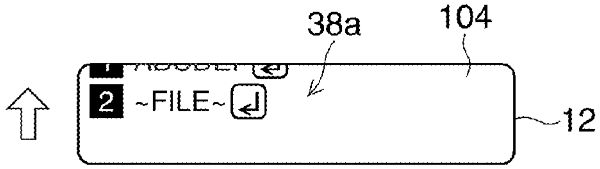
Figure 6D:
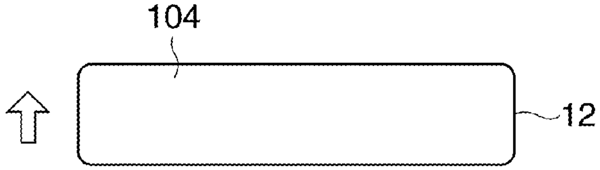
Figure 6E:
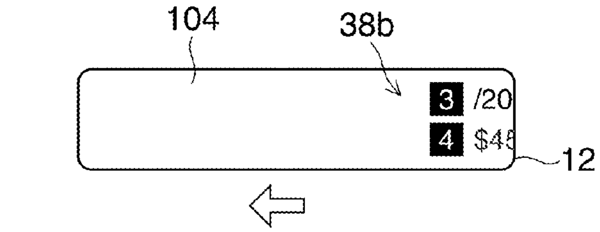
Figure 6F:
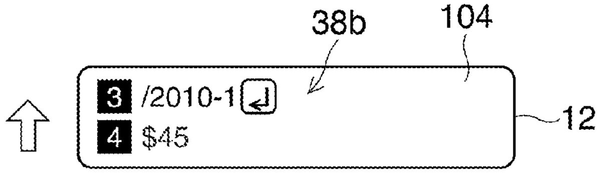
Figure 6G:
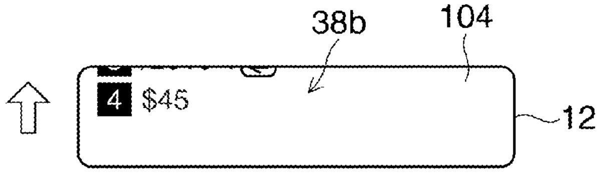

FIGS. 5A and 6G are diagrams showing transition of a display state in the display unit 12.

Figure 5B:
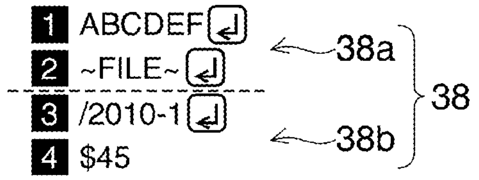
Figure 5C:
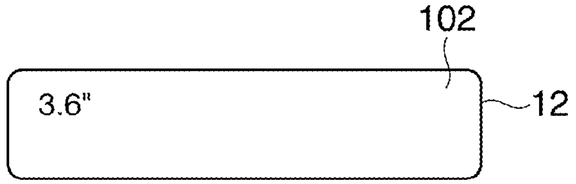
Figure 5D:
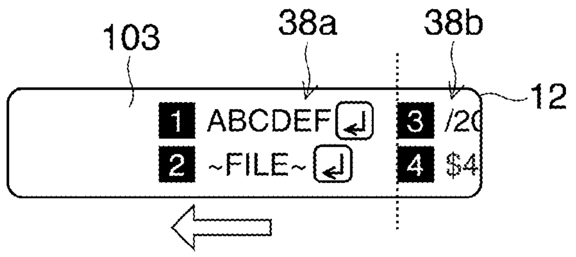
Figure 5E:
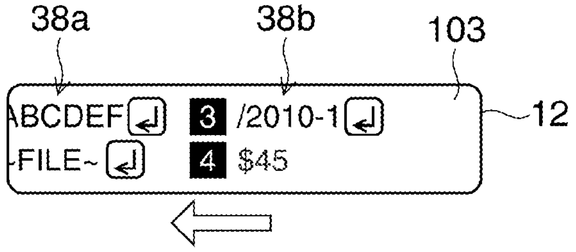

FIGS. 5A to 5E show an example of the case in which the above described first display method is performed, and FIG. 5A shows a text editing screen 101 that is displayed while being input by the keyboard 11, FIG. 5B shows a configuration example of the character string corresponding to the character code string that is stored in the document storage buffer 32*a*, FIG. 5C shows a print length display screen 102, and FIGS. 5D and 5E show transition of a scroll screen 103.

On the text editing screen 101 shown in FIG. 5A, characters input by the keyboard 11 are displayed as an input text 112. When the line feed code is input by the operation of the keyboard 11, a line feed character 113 is displayed in a corresponding position, and line-feeding is conducted with respect to the character string when the line feed character 113 is set as a line end. At the head of each line, a line head mark 111 is displayed. The line head mark 111 is a sign that is displayed on the display unit 12 to confirm a line position, so that the line head mark "1" indicates as being a first line, and the line head mark "2" indicates as being a second line. The line head mark 111 is displayed on the display unit 12, however, is not printed on the tape T. In addition, on the text editing screen 101, a cursor 114 is displayed in an input position in which characters are input by the keyboard 11.

The data dividing unit 311 divides, in a line unit, the character string corresponding to the character code string that is stored in the document storage buffer 32*a*. In the example shown in FIG. 5B, a character string 38 having four lines is divided into two blocks 38a and 38b. In the example of the present embodiment, the first block 38a includes a first line and a second line, and the second block 38b includes a third line and a fourth line. This is merely an example, and the data dividing unit 311 may divide the character string 38 into four blocks line by line. The number of lines of each of the divided blocks is set in advance based on a display resolution of the display unit 12, and the like, and stored in, for example, the ROM 33.

When the preview key of the keyboard 11 is operated in a state in which the text editing screen 101 is displayed on the display unit 12, the display control unit 310 reads the character code string from the document storage buffer 32a to generate the character string 38, and divides the character string 38 by a function of the data dividing unit 311. The display control unit 310 generates the display image data for displaying the print length display screen 102 shown in FIG. 5C to thereby output the generated data to the display driving unit 41, and displays the print length display screen 102 on the display unit 12. On the print length display screen 102, a length of the tape T which is required for printing the whole character string 38 is displayed. The print length may be a length excluding a margin generated before and after a printing area, or a length including the margin. The print length displayed on the print length display screen 102 may be calculated based on, for example, the number of characters.

Subsequently, the preview display control unit 312 switches a display on the display unit 12 into the scroll screen 103 shown in FIG. 5D. On the scroll screen 103, the character string is scrolled for each of the blocks divided by the data dividing unit 311. The arrow in the drawing indicates the direction of the scroll.

In the example of FIG. 5D, the first block 38a appears from the right end of the display unit 12, and is scrolled toward the left end of the display unit 12. Sequentially, the second block 38b is successively displayed on the display unit 12 in a state of being separated from the distal end of the first block 38a by a predetermined distance, and scrolled in the arrow direction shown in FIG. 5E. Here, when difference between lengths of the first line and the second line constituting the first block 38a exists, the preview display control unit 312 displays the second block 38b from a position (dashed line in the drawing) that is separated from a position of the distal end by a predetermined distance on the basis of the distal end of the longer side. The line head mark 111 is displayed in each block, so that a user may confirm that the displayed character string corresponds to the character of which line.

On the scroll screen 103, all blocks are scrolled in the same direction as the printing direction with respect to the tape T in an order of the character string 38 before the dividing. Next, after the end of a final block is moved to the outside of the display unit 12, that is, after the end of the final block is completely disappeared from the display unit 12, the text editing screen 101 (see, FIG. 5A) is repeatedly displayed on the display unit 12 by the display control unit 310.

FIGS. 6A to 6G show an example of transition of the scroll screen 104 when the second display method is performed.

In the example shown in FIGS. 6A to 6G, in the same manner as that of the first display method shown in FIGS. 5A to 5D, the case in which the character string 38 including four lines is divided into the first block 38a and the second block 38b two lines by two lines to thereby be displayed will be described. In addition, arrows shown in FIGS. 6A to 6G indicate a scroll direction of the displayed character string.

In the second display method, as shown in FIG. 6A, the first block 38a is first appeared from the right end of the display unit 12 by the preview display control unit 312, and is scrolled toward the left end of the display unit 12. As shown in FIG. 6B, when the tip end of the first block 38a reaches the left end of the display unit 12, the scroll direction in the scroll screen 104 is changed to a direction perpendicular to the scroll direction. In the example of FIG. 6A to 6G, the scroll direction to the left is changed to the upward direction. Due to this, as shown in FIGS. 6B and 6C, the first block 38a is scrolled upward in a position of the left end of the display unit 12, and displayed so as to be disappeared to the outside of the screen.

Thereafter, as shown in FIG. 6D, when the first block 38a is completely disappeared from the display unit 12, and the displayed block is absent, the preview display control unit 312 switches the scroll direction into the perpendicular direction, that is, into the original direction, so that the following second block 38b appears from the right end of the display unit 12 as shown in FIG. 6E. When the tip end of the second block 38b reaches the left end of the display unit 12 as shown in FIG. 6F by scrolling the second block 38b toward the left end of the display unit 12, the preview display control unit 312 changes the scroll direction on the scroll screen 104 into the upward direction. Due to this, as shown in FIG. 6G, the second block 38b is scrolled upward in a position of the left end of the display unit 12, and displayed so as to be disappeared to the outside of the screen.

In this manner, in the second display method, the character string of each of the blocks divided by the data dividing unit 311 is displayed on the display unit 12 for each of the blocks to be scrolled, so that the character string of the following block appears on the display unit 12 to be scrolled when a display of a single block is completed.

Figure 7:
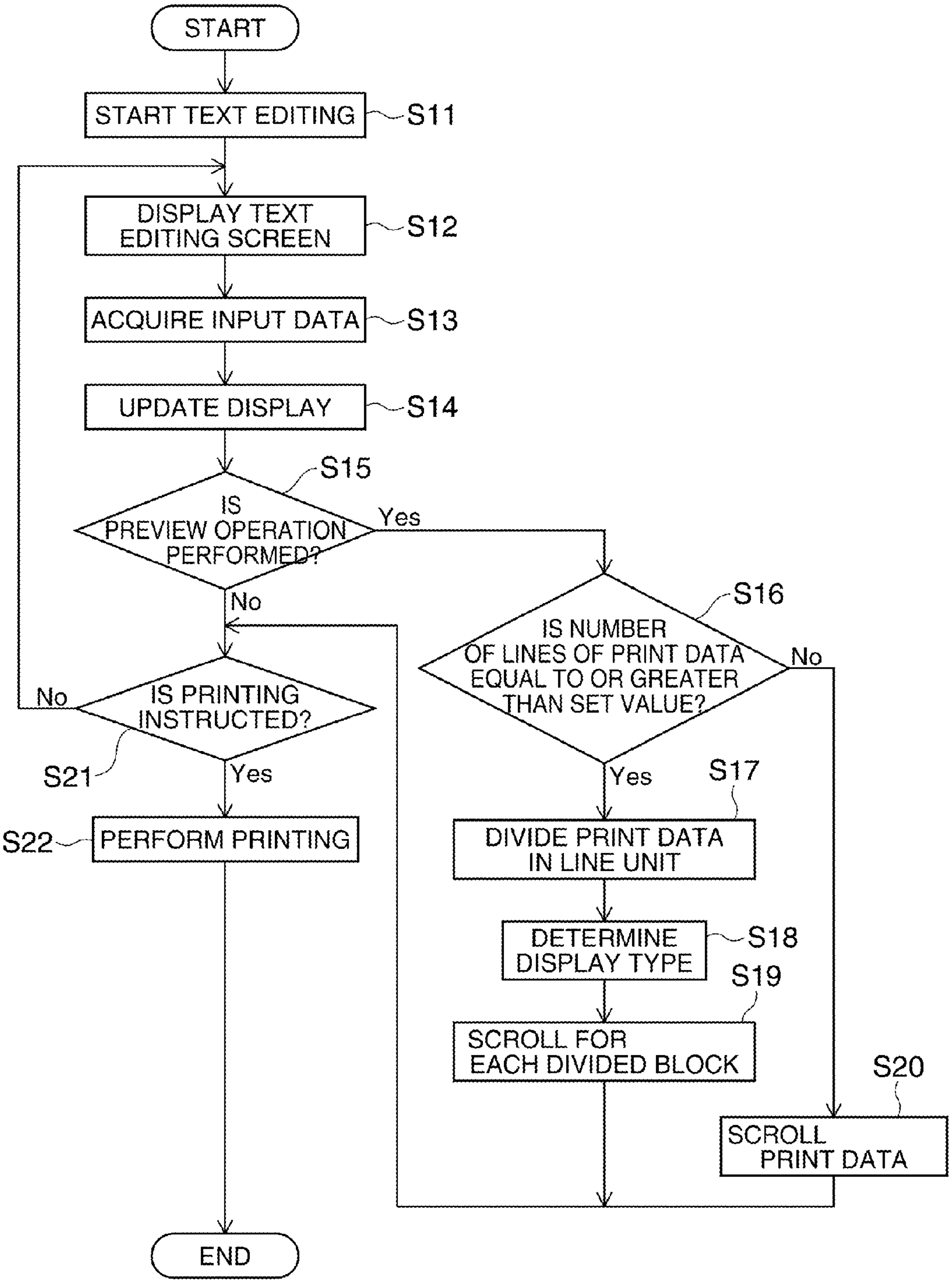
FIG. 7 is a flowchart showing operations of a tape printing apparatus.

FIG. 7 is a flowchart showing operations of the tape printing apparatus 1.

When the power source key of the keyboard 11 is operated, the control unit 30 of the tape printing apparatus 1 starts characters (print data) to be printed, and the like, and a text editing operation that can perform a line feed instruction (step S11), and displays the text editing screen 101 (see, FIG. 5A) on the display unit 12 (step S12). The input data acquisition unit 301 acquires a character code or a line feed code, which corresponds to the operation of the keyboard 11, every time the operation of the keyboard 11 is performed while the text editing screen 101 is displayed, and then stores the acquired code in the document storage buffer 32a (step S13). The display control unit 310 updates a display so that a character or a line feed character 113 which corresponds to the input character code is newly displayed on the display unit 12 (step S14).

In addition, the control unit 30 determines whether the operated key is the preview key (step S15) every time the key of the keyboard 11 is operated while the text editing is performed, and proceeds to step S21 when the preview key is not operated (step S15; No).

When the preview key is operated (step S15; Yes), the display control unit 310 starts a preview process. In the preview process, the data dividing unit 311 reads the character code string from the document storage buffer 32a, and determines whether the number of lines of the character string that is the print data is equal to or greater than the number of lines set in advance, based on the number of the line feed codes included in the character code string (step S16).

Here, when the number of lines of the character string is equal to or greater than the set value (step S16; Yes), the data dividing unit 311 acquires font data with reference to the character storage unit 34a based on the character code string that is acquired from the document storage buffer 32a, generates the character string corresponding to the character code string, and divides the character string into a plurality of blocks in a line unit (step S17). In step S17, the data dividing unit 311 may divide the character code string into the plurality of blocks in the line unit, and then generate the character string corresponding to the character code string of each block. Here, the data dividing unit 311 may divide the character string into the plurality of blocks in a character unit, however, preferably divide the character string into the plurality of blocks in the line unit so as to display so that the layout of the character string before the dividing is reflected.

Next, the preview display control unit 312 determines a display method of the plurality of blocks that is divided by the data dividing unit 311 (step S18). In step S18, whether the first display method, for example, shown in FIGS. 5D to 5E is the second display method shown in FIGS. 6A to 6G is determined. Next, the preview display control unit 312 generates display image data for displaying the screen in the form of the determined display to thereby output the generated display image data to the display driving unit 41, and displays the output image data on the display unit 12 for each of the blocks (step S19). When a predetermined time elapses after the scroll display is completed, the control unit 30 proceeds to step S21.

When the number of lines of the character string is less than the set value (step S16; No), the data dividing unit 311 displays, on the display unit 12, the character string corresponding to the character code string that is acquired from the document storage buffer 32*a* by the preview display control unit 312 without performing a process of dividing the character code string (step S20), and proceeds to step S21.

In step S21, the control unit 30 determines whether printing is instructed by an operation of the print key of the keyboard 11. Here, when the printing is not instructed (step S21; No), the control unit 30 returns to step S12. In addition, when the printing is instructed (step S21; Yes), the print control unit 303 acquires the character code string from the document storage buffer 32*a*, acquires font data corresponding to the character code string from the character storage unit 34*a* to generate print image data, and controls the head driving unit 42 and the transportation driving unit 43 to thereby perform printing on the tape T (step S22).

As described above, the tape printing apparatus 1 according to the embodiments to which the invention is applied includes the keyboard 11 of inputting the character code that is the print data and the line feed code that is the layout of the print data, the display unit 12, the data dividing unit 311 of dividing the print data into a plurality of blocks based on the layout input by the keyboard 11, the preview display control unit 312 of displaying, on the display unit 12, the character string for each of the blocks divided by the data dividing unit 311, and the thermal head 15 of printing the character string on the tape-shaped tape T in accordance with the layout input by the keyboard 11, so that the character string input by the keyboard 11 is divided into a plurality of blocks without breaking the layout designated by the line feed code to thereby be scrolled. Due to this, the character string to be printed may be displayed with excellent visibility on the display unit 12 in the state in which the layout at the time of printing is reflected, thereby confirming the layout at the time of printing on the display unit 12.

In addition, when the character string input by the keyboard 11 includes a plurality of lines, and the number of the plurality of lines exceeds the number of displayable lines of the display unit 12, the data dividing unit 311 divides the character string into the plurality of blocks in a line unit, so that the layout at the time of printing may be more appropriately confirmed on the display unit 12 by dividing the character string into the plurality of blocks without breaking the layout at the time of printing.

In addition, the preview display control unit 312 scrolls each of the blocks divided by the data dividing unit 311 in the same direction as that when the thermal head 15 prints the character string on the tape T, thereby displaying the print data on the display unit 12 in a manner such that the state in which the character string is printed is more strongly reflected.

In addition, the preview display control unit 312 disposes respective characters in the character string of each of the blocks divided by the data dividing unit 311, in the same order as that of the character code string before the dividing, and scrolls the disposed characters, thereby more accurately confirming the layout at the time of printing on the display unit 12.

In addition, in the first display method, the preview display control unit 312 disposes the following block at the end of a single block, and successively displays a plurality of blocks on the display unit 12, so that the whole character string may be smoothly displayed by scrolling the whole character string in a single direction, thereby rapidly confirming the layout of the character string at the time of printing.

In addition, in the second display method, the preview display control unit 312 scrolls a single block to the end thereof in the first direction (for example, to the left) on the display unit 12, scrolls the single block in the second direction (for example, in the upward direction) perpendicular to the first direction to delete the single block from the display unit 12, and scrolls the following block in the second direction to display the following block on the display unit 12, so that the layout of the character string at the time of printing may be confirmed on the display unit 12 without generating a sense of discomfort causing by dividing and displaying the character string, by changing the direction of the scroll display.

In addition, the above described embodiment is an example to which the invention is applied, and diversely modified and improved to be carried out.

For example, in the above described embodiment, the number of lines divided by the data dividing unit 311 may be arbitrarily changed, and appropriately determined in accordance with a display size and a display resolution of the display unit 12 as long as a single block is displayable on the display unit 12 at one time. In the above described embodiment, the configuration in which the print data input by the operation of the keyboard 11 is acquired by the input data acquisition unit 301, and the acquired print data is stored in the document storage buffer 32*a* to be scrolled has been described as an example, however, a configuration in which the character code input from a device externally connected to the tape printing apparatus 1 is acquired as the print data, and the acquired print data is scrolled in accordance with the operation of the preview key to be printed may be used.

In addition, in the above described embodiment, as the printing method for printing characters, and the like on the tape T, the case of using a thermal transfer method by the thermal head 15 has been described as an example, however, the invention is not limited thereto. Other printing methods such as an ink jet method of ejecting ink droplet to a print medium from a nozzle of a print head, a thermal method of generating color by adding heat to a print medium enabling thermosensitive recording using a recording head, and the like may be used.

In addition, in the above described embodiment, a computer-readable recording medium may include a program for realizing the above functions stored in the ROM 33. As the recording medium in this case, various media which is readable by the computer such as flexible disks or hard disks, CD-ROM (Compact Disk-Read Only Memory), DVD (Digital Versatile Disk), Blu-ray Disc (registered trademark), magneto-optical disks, a card type or stick type non-volatile storage device using a semiconductor memory element, an internal storage device of a tape printing apparatus (semiconductor memory such as RAM or ROM), a stationary external storage device using a magnetic recording medium, and the like may be used.

What is claimed is:

1. A tape printing apparatus, comprising:

an input unit configured to input print data and a layout of the print data;

a display unit configured to have a display screen;

a dividing unit configured to divide the print data into a plurality of blocks to be displayed on the display screen before being printed, based on the layout input by the input unit;

a display control unit configured to display the print data as the plurality of blocks on the display screen before the print data is printed, by scrolling through the plurality of blocks on the display screen, using the display unit, for each of the plurality of blocks divided by the dividing unit; and a printing unit configured to print the print data on a tape-shaped print medium in accordance with the layout input by the input unit, wherein, when the layout of the print data input by the input unit is configured in a plurality of lines, and a number of the plurality of lines exceeds a number of lines displayable on the display screen, the dividing unit divides the print data into the plurality of blocks in a line unit.

2. The tape printing apparatus according to claim 1, wherein the display control unit scrolls, in the same direction as that when the printing unit prints the print data on the print medium, each block of the print data divided by the dividing unit.

3. The tape printing apparatus according to claim 1, wherein the display control unit arranges, in the same order as an arrangement order in the layout input by the input unit, data within each block of the print data divided by the dividing unit, and displays the arranged data by scrolling the arranged data.

4. The tape printing apparatus according to claim 1, wherein the display control unit arranges the following block at an end of a single block of the print data, and successively displays the plurality of blocks by scrolling the plurality of blocks using the display unit.

5. The tape printing apparatus according to claim 1, wherein the display control unit scrolls a single block of the print data to the end thereof on the display screen in a first direction, scrolls a corresponding block in a second direction perpendicular to the first direction to thereby remove the scrolled corresponding block from the display screen, and scrolls the following block in the second direction to thereby display the scrolled next block on the display screen.

6. A displaying method in a tape printing apparatus which includes a display unit for displaying input print data on a display screen and prints the print data on a tape-shaped print medium in accordance with an input layout, the displaying method, comprising:

dividing the print data into a plurality of blocks to be displayed on the display screen before being printed, based on the input layout; and displaying the print data as the plurality of blocks on the display screen before the print data is printed, by scrolling through the plurality of blocks on the display screen, using the display unit for each of the plurality of blocks divided by the dividing of the print data, and printing the print data on a tape-shaped print medium in accordance with the input layout, wherein, when the input layout of the print data is configured in a plurality of lines, and the number of the plurality of lines exceeds the number of lines displayable on the display screen, the print data is divided into the plurality of blocks in a line unit by the dividing of the print data.

7. The displaying method according to claim 6, wherein the displaying step scrolls, in the same direction as that when the printing unit prints the print data on the print medium, each block of the print data divided by the dividing unit.

8. The displaying method according to claim 6, further comprising:

arranging, in the same order as an arrangement order in the input layout, data within each block of the divided print data; and displaying the arranged data by scrolling the arranged data.

9. The displaying method according to claim 6, further comprising:

arranging the following block at an end of a single block of the print data; and displaying successively the plurality of blocks by scrolling the plurality of blocks.

10. The displaying method according to claim 6, further comprising:

scrolling a single block of the print data to the end thereof on the display screen in a first direction;

scrolling a corresponding block in a second direction perpendicular to the first direction to thereby remove the scrolled corresponding block from the display screen; and scrolling the following block in the second direction to thereby display the scrolled next block on the display screen.

* * * * *